United States Patent [19]

Borchert et al.

[11] 4,072,634

[45] Feb. 7, 1978

[54] PRODUCTION OF POLYURETHANE FOAMS FROM MODIFIED POLYESTER POLYOL PREPOLYMERS

[75] Inventors: Alfred E. Borchert, Cherry Hill, N.J.; Charles J. Kremer, Brookhaven, Pa.

[73] Assignee: Atlantic Richfield Company, Los Angeles, Calif.

[21] Appl. No.: 340,406

[22] Filed: Mar. 12, 1973

[51] Int. Cl.$^2$ .............. C08G 18/46; C08G 18/10; C08G 18/14
[52] U.S. Cl. .................... 260/2.5 A; 260/2.5 AN
[58] Field of Search ........ 260/2.5 A, 77.5 B, 2.5 AN, 260/2.5 AT, 77.5 AT

[56] References Cited

U.S. PATENT DOCUMENTS

| | | |
|---|---|---|
| 3,531,425 | 9/1970 | Burk ................................ 260/37 N |
| 3,554,962 | 1/1971 | Fischer ........................ 260/77.5 AT |
| 3,652,507 | 3/1972 | Burk ............................. 260/77.5 B |
| 3,661,811 | 5/1972 | Hardy ............................. 260/2.5 AN |
| 3,663,514 | 5/1972 | Campbell ..................... 260/77.5 AT |
| 3,702,320 | 11/1972 | Fritok ............................... 260/2.5 A |
| 3,706,710 | 12/1972 | Camilleri ......................... 260/75 NT |
| 3,790,508 | 2/1974 | Triolo ............................ 260/2.5 AT |

*Primary Examiner*—C. Warren Ivy
*Attorney, Agent, or Firm*—Coleman R. Reap

[57] ABSTRACT

A modified polyester polyol prepolymer having a hydroxyl functionality of between 2 and 3 is produced by reacting a cyclic nitrile carbonate such as adipodi(nitrile carbonate) with a polyester polyol having hydroxyl numbers of about 50 to about 450. The product has a viscosity preferably in the range of about 15,000 to 30,000 centipoise at about 25° C. Novel urethane foams are prepared from the modified polyester polyol prepolymers by reacting the same with aromatic isocyanates to form urethane foams having improved stability to ultraviolet discoloration and improved hydrolytic stability.

5 Claims, No Drawings

PRODUCTION OF POLYURETHANE FOAMS FROM MODIFIED POLYESTER POLYOL PREPOLYMERS

DETAILED DESCRIPTION OF THE INVENTION

In accordance with the present invention, a cyclic nitrile carbonate, such as adipodi(nitrile carbonate), is reacted with a polyester polyol having hydroxyl numbers (defined as mg. of KOH/g. sample) of about 50 to about 450. The resulting modified polyester polyols have a hydroxyl functionality between 2 and 3 and preferably have a viscosity in the range of about 15,000 to 30,000 centipoise at about 25° C., thereby making them desirable for the production of urethane foam (without affecting the process for the production of the foam). Thus, the production of foam can be carried out by conventional means and utilizing conventional equipment. The novel urethane foams thus produced have improved stability to ultraviolet discoloration as shown by exposure to ultraviolet radiation under controlled conditions. In addition, the resultant foams can be used for textile applications since, in addition to the improved stability to ultraviolet discoloration, they possess improved hydrolytic stability because of their increased lipophilic/hydrophilic ratio.

The cyclic nitrile carbonates used in the present invention have the structure:

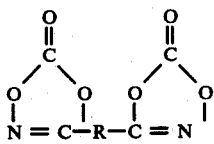

wherein R is a saturated aliphatic or alicyclic organic radical containing up to 50 and preferably about 2 to 12 carbon atoms and consisting essentially of carbon and hydrogen and free of reactive hydrogens as determined by the Zerewitinoff test. A compound which contains a reactive hydrogen as determined by the Zerewitinoff test is one which, when contacted with a Grignard solution of methyl magnesium iodide, will effect the liberation of methane by decomposition of the Grignard reagent. By "consisting essentially of carbon and hydrogen" is meant that the essential components of the radical are carbon and hydrogen but that there can be included therein other elements as well, so long as they do not materially affect the radical's basic characteristic of being non-interfering in the condensation reaction of the cyclic nitrile carbonate group with hydroxyl groups. Examples of non-interfering groups which can be present in R and which contain elements other than carbon and hydrogen are alkoxy, nitro, and halo groups. When R is a saturated aliphatic compound, it can be either straight or branched chain. The cyclic nitrile carbonate group can be attached to a cycloaliphatic ring carbon atom or to a non-ring carbon atom. The molecular weight of the cyclic nitrile carbonate will often be below about 75,000.

The cyclic nitrile carbonates can be prepared by phosgenating the corresponding hydroxamic acids, preferably while the latter are in solution in a stable solvent. The hydroxamic acids, in turn, can be prepared by various methods known in the art, such as, for example, by reacting the methyl ester of the corresponding carboxylic acids with hydroxylamine. Examples of suitable cyclic nitrile carbonates include, for instance, cyclohexane di(nitrile carbonate), ethane di(nitrile carbonate), propane-di(nitrile carbonate), butane-1,4-di(nitrile carbonate), hexane-1,6-di(nitrile carbonate), propane-1,2,3,tri(nitrile carbonate), etc.

The hydroxyl group-containing polyesters useful in accordance with the present invention may be obtained by the reaction of aliphatic or aromatic polycarboxylic acids with saturated aliphatic or alicyclic polyhydric alcohols in the manner well known to the art in proportions that result in esters having at least two reactive hydroxyl groups. Preferred polyesters are the hydroxyl-terminated polyesters prepared by condensation of one or more saturated aliphatic polyhydroxyl alcohols, with one or more saturated aliphatic, including cycloaliphatic polycarboxylic acids or esters. The polyhydroxyl alcohols used to prepare such polyesters are often predominantly diols, and the acids are frequently dicarboxylic acids (including their anhydrides) and preferably contain from 4 to 50 carbon atoms, e.g., adipic acid, sebacic acid, phthalic acid, etc.

Other suitable polymeric compounds include polyesters having substituent nitrogen, sulfur or chlorine groups which will not interfere with urethane formation or generate color producing groupings.

The functionality of the polyester polyols used in the prepolymerization reaction may vary between 2 and 3. However, the ratio of di- and tri-functional groups is such that the average hydroxyl functionality of the finished prepolymer is between 2 and 3. This has been found to be the best range for the production of flexible, open-celled polyurethanes of superior quality.

The preparation of the modified polyester polyols of the present invention can be carried out at a temperature of about 70° to 150° C. The reaction can be catalyzed thermally at temperatures of about 120° to 150° C., however, the reaction is much more rapid if a catalyst system is utilized. When a catalyst is used, the reaction is usually carried out at a temperature in the range of about 110° to 120° C.

The catalyst may be a basic material such as a tertiary amine, having a $P^KA$ value greater than 8, e.g., triethylamine, as disclosed in U.S. Pat. No. 3,531,425, the disclosure of which is incorporated herein by reference. Another catalyst for use in accordance with the present invention is a combination of a first metal selected from Groups III through V of the Periodic System and a second metal selected from Groups I and II and the iron series of Group VIII of the Periodic System as disclosed in U.S. Pat. No. 3,652,507, which disclosure is incorporated herein by reference. Yet another useful catalyst in accordance with the present invention is set forth in U.S. Pat. No. 3,702,320, which disclosure is also incorporated herein by reference. In accordance with this patent, a compound of aluminum, tin, titanium, zinc, bismuth or iron is dissolved in the reaction mixture. If the compound is one of aluminum, tin, titanium or bismuth, the reaction is run in the absence of metals of Groups I, II, and the iron series of Group VIII of the Periodic System. On the other hand, if the metal compound is a compound of zinc or iron, the reaction is run in the absence of metals of Groups III through V of the Periodic System. This latter catalyst, particularly the combination of dibutyl tin dilaurate and sodium t-butoxide, has been found to be particularly useful in the present reaction.

The relative proportions of polyester polyol and cyclic nitrile carbonate are such that the reaction product retains sufficient hydroxyl functionality to produce acceptable polyurethane foam when reacted with aromatic isocyanates. To achieve this, the polyester polyol and cyclic nitrile reactants are used in proportions sufficient to provide a ratio of hydroxyl groups to cyclic nitrile groups of 2 to 10:1.

As was explained above, cyclic nitrile carbonates cannot be satisfactorily used to directly produce polyurethane foams by reaction with polyols because of the fact that the temperature required to react the cyclic nitrile carbonates and the polyols is so high that good quality foams cannot be obtained. However, in the process of the invention, polyester polyols of low molecular weight can be reacted with cyclic nitrile carbonates to produce the polyol prepolymers which are used in the foam producing reaction because at that stage of the process high temperatures can be tolerated. In other words, the cyclic nitriles are used in the first stage of the process to replace some of the ester linkages that would ordinarily occur in the polyol with urethane linkages and for this reaction high temperatures can be tolerated.

Reaction times will vary and will be dependent to some extent on the molecular weight desired for the product. Usually the reaction will be complete in up to about 12 hours, often in about 1 to 5 hours. Subatmospheric, atmospheric or superatmospheric pressures can be used.

The prepolymerization is carried out under conditions such that the viscosity of the resulting product will be approximately the same as that of those polyester polyols which are ordinarily used to produce polyurethane foams. Thus, conventional foaming techniques can be used. It will be observed that the prepolymer polyols of the invention will contain considerably fewer ester linkages than would be the case if cyclic nitrile carbonates were not used to modify the polyols due to the fact that some of the linkages which would have been ester linkages are urethane linkages. Thus, the hydrolytic stability of the polymer will be greatly improved since there are fewer ester linkages available for hydrolysis.

In a preferred method of preparing modified polyester prepolymers by the process of the present invention, the polyol reactant is degassed prior to being admixed with either the catalyst or the poly(nitrile carbonate). The purpose of the degassing is to remove water and volatiles from the system. Water might serve to react with and dilute the effect of some of the catalysts used; also, it could react with the cyclic nitrile carbonate reactant under certain conditions. The degassing can often be accomplished by subjecting the polyol to a temperature of about 60° to 150° C. at about 0.25 to 50 mm. Hg pressure for from 15 to 60 minutes. After the addition of the catalyst, further degassing — say, for up to about 4 hours — under the same conditions may be conducted. After addition of catalyst and such further degassing, a substantially oxygen-free atmosphere, for example, a nitrogen or other inert gas atmosphere, is advantageously created and maintained in the reaction vessel, during which time the desired poly(nitrile carbonate) is added, preferably in small portions over periods of, say, about three minutes to two hours. During the addition of the carbonate the reaction mixture can be stirred and the temperature advantageously maintained between about 110° and 120° C. Following complete addition of the carbonate, the temperature of the reaction mixture is maintained in the range of about 110° – 130° C. for, say, about fifteen minutes to about 12 hours, the time being dependent on other variables employed in carrying out the polymerization. The reaction mixture is advantageously stirred during the reaction. The modified polyol prepolymers are stable intermediate compounds which can be immediately reacted with aromatic polyisocyanates to produce hydrolytically and light stable polyurethane foams or they can be stored for later usage.

To produce the polyurethane foams of the invention, the modified polyester polyol prepolymer is reacted with one or more aromatic polyisocyanates under conditions conventionally used to make polyurethane foam. The aromatic isocyanates utilized as well as the means and equipment for carrying out the reaction are conventional and well known to those skilled in the art. For example, tolylene diisocyanate; 3,3'-bitolylene-4,4'-diisocyanate; diphenylmethane-4,4'-diisocyanate; 3,3'-dimethyldiphenyl-methane-4,4'-diisocyanate; meta-phenylene diisocyanate; 2,4-tolylene diisocyanate; triphenylmethane triisocyanate; dianisidine diisocyanate; etc., all are useful with the first mentioned material being the most commonly used. As can be readily seen, the higher the molecular weight of the prepolymer the lower the amount of aromatic isocyanate that is needed to produce a foam of a given average molecular weight polymer.

It is preferable to react the aromatic polyisocyanate and modified polyol prepolymer in amounts that will produce an NCO/OH ratio of about 1 to 1.2.

The reaction between the prepolymer and the aromatic polyisocyanate is carried out in the presence of an expanding agent in sufficient quantity to produce a foamed product having the desired density. Water is commonly added to the reaction mixture to produce the foam. The water reacts with excess isocyanate to produce carbon dioxide. The amount of water added is determined by the degree of expansion desired. Generally, amounts of about ½ to 5 parts of water per 100 parts of modified polyester polyol will produce the desired results. If desired, a non-chemical blowing agent, such as the lower fluorochlorocarbon, can be used with or in place of the water.

In accordance with the usual practice, inert inorganic or organic fillers, or both, and other additives may be included in the reaction mixture. Suitable inert inorganic materials include, for example, clay, talc, silica, carbon black, asbestos, glass, mica, calcium carbonate, antimony oxide, and the like. Organic fillers include, for instance, the various polymers, copolymers, and terpolymers of vinyl chloride, vinyl acetate, acrylonitrile, acrylamide, styrene, ethylene, propylene, butadiene, divinylbenzenes, etc. Other additives which may be added include plasticizers, such as dioctyl phthalate and di(2-ethylhexyl)adipate, extenders, softeners, coloring agents, and emulsifiers.

The invention will be better understood by reference to the following examples.

EXAMPLE I

Three urethane foams having the formulations shown in Table I were prepared by the followin procedure.

A quantity of polyester polyol was devolatilized by heating under reduced pressure. Catalyst was added and the mixture was maintained at 110° C. and 30 mm of pressure with agitation for about 1.5 hours. Adipodi(nitrile carbonate) was then added while maintaining the reaction mixture at 100°–120° C. and under a blanket of nitrogen. The mixture was agitated for an additional 2.5 hours at about 120° C. after which it was cooled to room temperature. The remaining parts of component B were than added, with agitation, in the order shown in Table I with water being added last. Component A, toluene diisocyanate, was next added and the reaction mixture was mixed as rapidly and as thoroughly as possible immediately prior to pouring it into a 2 × 0.5 × 1 wax lined carton. The foams developed in a normal time essentially filling the container about 90% of capacity. After aging at room temperature for 24 hours, the foams were evaluated. The results are tabulated in Table I.

TABLE I

|  | 1 | 2 | 3 |
| --- | --- | --- | --- |
| Component B (parts by weight) |  |  |  |
| Polyester Polyol [a], 52 hydroxyl number | 100 | 100 | 100 |
| Catalyst [b] | 0.5 | 0.1 | 0.1 |
| Adipodinitrile Carbonate | 2.14 | 1.1 | 0.54 |
| L-532 Silicone (Union Carbide Corp.) | 1 | 1 | 1 |
| Formez 77–86 (Witco Chem. Co.) | 0.5 | — | 0.5 |
| Armeen DM16D (Armour Co.) | 0.17 | 0.3 | 0.17 |
| N-Ethyl Morphline | 0.94 | 1.2 | 0.94 |
| Water | 3.6 | 3.6 | 3.6 |
| Component A (parts by weight) |  |  |  |
| Toluene Diisocyanate | 41.67 | 50.1 | 42.9 |
| NCO/OH (× 100) | 101 | 101 | 101 |
| Viscosity Ratio (component B/ polyester polyol[a]) | 1.9 | 1.4 | 1.1 |
| Discoloration Time (hrs./hrs. for control[c] | 12 | 9 | 8 |

[a]Formez 50 (a trademarked product of Witco Chem. Co.)
[b]Product of reaction of 1 equiv. of dibutyltin oxide, 1 equiv. of stannous octoate and 2 equiv. of sodium t-butoxide
[c]Formulation without adipodinitrile carbonate The above example shows that prepolymer formation even with small amounts of adipodinitrile carbonate yields polyurethane foams with improved resistance to discoloration by ultraviolet irradiation. This example also shows that relatively low levels of adipodinitrile carbonate produce prepolymers of high viscosity when comparatively high molecular weight polyester polyols were employed.

Although the invention has been described by particular reference to specific examples, it is understood that the breadth of the invention is not limited thereto but is only determined by the scope of the appended claims.

We claim:

1. A method of preparing a foam polyurethane composition having improved light and hydrolytic stability comprising:
    (a) Forming a modified polyester prepolymer having a hydroxyl functionality between 2 and 3 by reacting a cyclic nitrile carbonate having the structure:

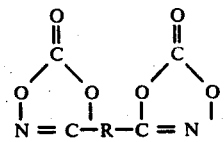

wherein R is a saturated aliphatic or alicyclic organic radical free of reactive hydrogens as determined by the Zerewitinoff Test having up to about 50 carbon atoms with a polyester polyol having a hydroxyl number of about 50 to about 450, the relative amounts of polyester polyol and cyclic nitrile carbonate being sufficient to provide a ratio of hydroxyl groups to cyclic nitrile groups of about 2 to 10:1, and
    (b) Reacting the modified polyester polyol with an aromatic polyisocyanate in the presence of an amount of water sufficient to produce a foam of the desired density.

2. The process of claim 1 wherein the reaction between the cyclic nitrile carbonate and the polyester polyol is carried out catalytically at a temperature of about 110° to 120° C.

3. The process of claim 1 wherein the aromatic polyisocyanate is tolylene diisocyanate.

4. The process of claim 1 wherein R contains about 2 to 12 carbon atoms.

5. The process of claim 4 wherein the cyclic nitrile carbonate is adipodi(nitrile carbonate).

* * * * *